(12) United States Patent
Sugiyama et al.

(10) Patent No.: US 6,659,054 B2
(45) Date of Patent: Dec. 9, 2003

(54) INTERNAL COMBUSTION ENGINE WITH VARIABLE VALVE CONTROL DEVICE

(75) Inventors: Takanobu Sugiyama, Yokohama (JP); Shinichi Takemura, Yokohama (JP); Tsuneyasu Nohara, Kanagawa (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 10/355,100

(22) Filed: Jan. 31, 2003

(65) Prior Publication Data

US 2003/0159668 A1 Aug. 28, 2003

(30) Foreign Application Priority Data

Feb. 25, 2002 (JP) ........................................ 2002-047226

(51) Int. Cl.⁷ .................................................. F01L 1/34
(52) U.S. Cl. ................................ 123/90.16; 123/90.15; 123/478; 123/480
(58) Field of Search ...................... 123/90.15, 90.16, 123/478, 480, 305, 445

(56) References Cited

U.S. PATENT DOCUMENTS

| | | | | |
|---|---|---|---|---|
| 5,636,603 A | | 6/1997 | Nakamura et al. | ........ 123/90.17 |
| 5,685,276 A | * | 11/1997 | Tanaka et al. | ............... 123/478 |
| 5,832,901 A | * | 11/1998 | Yoshida et al. | .............. 123/478 |
| 6,032,652 A | * | 3/2000 | Nozawa et al. | .............. 123/478 |
| 6,062,201 A | * | 5/2000 | Nozawa et al. | .............. 123/478 |

FOREIGN PATENT DOCUMENTS

| | | | |
|---|---|---|---|
| EP | 0 854 280 A1 | 7/1998 | |
| JP | 8-260923 A | 10/1996 | ............. F01L/3/24 |
| JP | 11-107725 A | 4/1999 | ........... F01L/13/00 |
| JP | 2001-221083 A | 8/2001 | ........... F02D/41/04 |

OTHER PUBLICATIONS

Patent Abstracts of Japan, vol. 1998, No. 4, (Mar. 31, 1998) JP 9–324672 (Dec. 16, 1997).
Patent Abstracts of Japan, vol. 2000, No. 1, (Jan. 31, 2000) JP 11–294208 (Oct. 26, 1999).
Patent Abstracts of Japan, vol. 1999, No. 5, (May 31, 1999) JP 11–030142 (Feb. 2, 1999).

* cited by examiner

*Primary Examiner*—Thomas Denion
*Assistant Examiner*—Kyle Riddle
(74) *Attorney, Agent, or Firm*—Foley & Lardner

(57) ABSTRACT

An internal combustion engine comprises a variable valve control device that varies a lift degree of an intake valve, an air intake passage led to an intake port of the engine that is incorporated with the intake valve and a fuel injection valve arranged to inject fuel into the intake port. The fuel injection valve has a first injection mode wherein each fuel injection shot is entirely carried out during opening period of the intake valve and a second injection mode wherein each fuel injection shot entirely finishes prior to opening action of the intake valve. A control unit is further employed by the engine, which allows the fuel injection valve to select one of the first and second injection modes in accordance with the lift degree of intake valve effected by the variable valve control device.

10 Claims, 13 Drawing Sheets

FIG.4

| ENGINE OPERATION CONDITION | VALVE LIFT CHARACTERISTICS |
|---|---|
| IDLING (& VERY LOW LOAD, MIDDLE & HIGH SPEED) | LIFT DEGREE/WORKING ANGLE : VERY SMALL<br>PHASE : MOST RETARDED<br> |
| LOW LOAD (& IDLING WITH AUXILIARY DEVICE DRIVEN) | LIFT DEGREE/WORKING ANGLE : VERY SMALL~SMALL<br>PHASE : ADVANCED<br>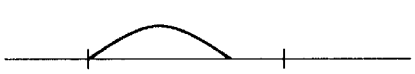 |
| MIDDLE LOAD | LIFT DEGREE/WORKING ANGLE : SMALL<br>PHASE : MOST ADVANCED<br> |
| HIGH LOAD LOW SPEED | LIFT DEGREE/WORKING ANGLE : SMALL~MIDDLE<br>PHASE : MOST RETARDED OR MOST ADVANCED<br> |
| HIGH LOAD MIDDLE SPEED | LIFT DEGREE/WORKING ANGLE : MIDDLE<br>PHASE : MOST RETARDED OR MOST ADVANCED<br> |
| HIGH LOAD HIGH SPEED | LIFT DEGREE/WORKING ANGLE : LARGE<br>PHASE : MOST RETARDED OR MOST ADVANCED<br> |

INTERNAL COMBUSTION ENGINE WITH VARIABLE VALVE CONTROL DEVICE

BACKGROUND OF INVENTION

1. Field of Invention

The present invention relates in general to fuel injection type internal combustion engines and more particularly to the internal combustion engines of a type that is equipped with a variable valve control device.

2. Description of Related Art

Hitherto, various types of internal combustion engines of the above-mentioned type have been proposed and put into practical use particularly in the field of wheeled motor vehicles. Some of them are disclosed in Laid-open Japanese Patent Applications (Tokkai) 2001-221083 and 8-260923. In the publication of 2001-221083, a base operation is so made that fuel injection finishes before opening of an intake valve, and when a valve overlapping becomes to a marked value due to changing of the phase of a lift degree/working angle of an intake valve, retarding of the fuel injection timing is carried out. In the publication 8-260923, there is shown a variable valve control device that continuously varies a lift degree of each intake valve in accordance with an operation condition of an internal combustion engine.

SUMMARY OF INVENTION

In the internal combustion engines equipped with a variable valve control device that varies the lift degree of each intake valve, it is known that a flow speed of intake air near the intake valve greatly varies in accordance with the operation condition of the variable valve control device. That is, for example, when the valve control device provides the intake valve with a smaller lift degree, the intake air flow speed become great. However, hitherto, even by the above-mentioned publications, assured measures for controlling a fuel injection timing in accordance with the lift degree of the intake valve have been given little thought.

Accordingly, it is an object of the present invention to provide an internal combustion engine that precisely controls the fuel injection timing in accordance with a lift degree of intake valve.

According to a first aspect of the present invention, there is provided an internal combustion engine which comprises a variable valve control device that varies a lift degree of an intake valve; an air intake passage led to an intake port of the engine that is incorporated with the intake valve; a fuel injection valve arranged to inject fuel into the intake port, the fuel injection valve having a first injection mode wherein each fuel injection shot is carried out during opening period of the intake valve and a second injection mode wherein each fuel injection shot finishes prior to opening action of the intake valve; and a control unit that allows the fuel injection valve to select one of the first and second injection modes in accordance with the lift degree of intake valve effected by the variable valve control device.

According to a second aspect of the present invention, there is provided an internal combustion engine which comprises a variable valve control device including a lift degree/working angle varying mechanism that varies a lift degree/working angle of an intake valve, and a phase varying mechanism that varies an operation phase of the intake valve; an air intake passage led to an intake port of the engine that is incorporated with the intake valve; a fuel injection valve arranged to inject fuel into the intake port, the fuel injection valve being arranged to have a first injection mode wherein each fuel injection shot is entirely carried out during opening period of the intake valve and a second injection mode wherein each fuel injection shot entirely finishes prior to opening action of the intake valve; and a control unit that controls the variable valve control device and the fuel injection valve in accordance with an operation condition of the engine, the control unit allowing the fuel injection valve to select one of the first and second injection modes in accordance with the lift degree/working angle of intake valve effected by the lift degree/working angle varying mechanism.

According to a third aspect of the present invention, there is provided a method for controlling an internal combustion engine which includes a variable valve control device that varies a lift degree of an intake valve; an air intake passage led to an intake port of the engine that is incorporated with the intake valve; and a fuel injection valve arranged to inject fuel into the intake port, the fuel injection valve having a first injection mode wherein each fuel injection shot is carried out during opening period of the intake valve and a second injection mode wherein each fuel injection shot finishes prior to opening action of the intake valve. The method comprises allowing the fuel injection valve to select one of the first and second injection modes in accordance with the lift degree of intake valve effected by the variable valve control device.

BRIEF DESCRIPTION OF DRAWINGS

FIG. 4 is a table showing valve lift characteristic in typical operation conditions of an associated internal combustion engine;

DETAILED DESCRIPTION OF EMBODIMENTS

In the following, the present invention will be described in detail with reference to the accompanying drawings.

Figure 1:
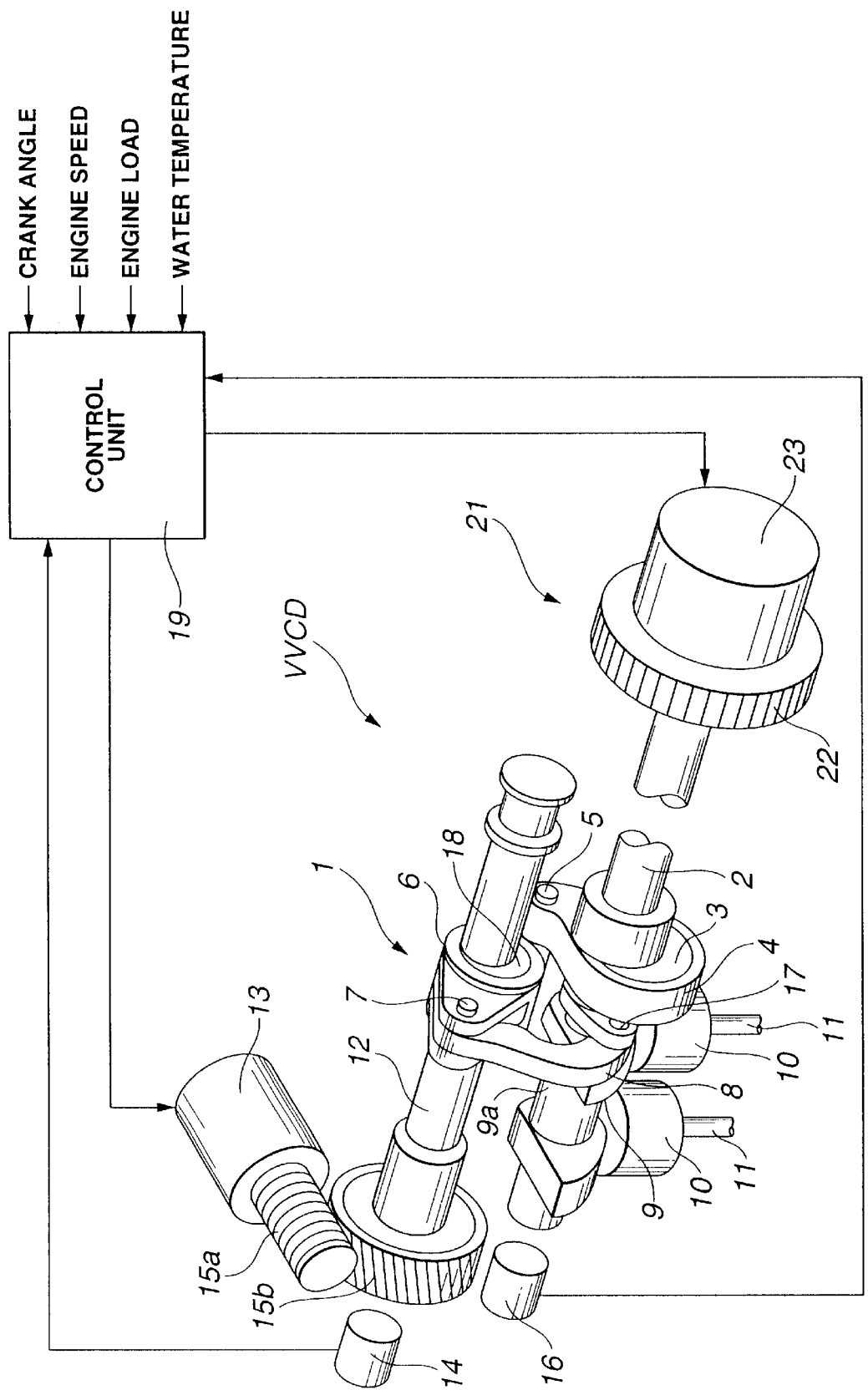
FIG. 1 is a perspective view of a variable valve control device employed in an internal combustion engine of the present invention.

In FIG. 1, there is shown a variable valve control device VVCD for controlling movement of each intake valve of an internal combustion engine according to the present invention.

As shown, the variable valve control device VVCD comprises generally a lift degree/working angle varying mechanism 1 that varies a lift degree/working angle of each intake valve of the engine and a phase varying mechanism 21 that varies (viz., advances or retards) the phase of a center position of the lift degree/working angle of the intake valve, viz., the operation phase of the intake valve relative to a crankshaft (not shown) of the engine.

First, description will be directed to the lift degree/ working angle varying mechanism 1. Since this mechanism 1 is described in detail in Laid-open Japanese Patent Application (Tokkaihei) 11-107725, the description will be made briefly.

As shown in FIG. 1, lift degree/working angle varying mechanism 1 is incorporated with intake valves 11 and comprises a drive shaft 2, an eccentric cam 3 that is tightly held by drive shaft 2, a control shaft 12 that is positioned above and extends along drive shaft 2, an eccentric cam 18 that is provided by control shaft 12, a rocker arm 6 that is rotatably supported by eccentric cam 18 and swing cams 9 that are in contact with tappets 10 of intake valves 11. It is to be noted that the two swing cams 9 are integrally connected through a cylindrical connector 9a rotatably mounted on drive shaft 2, and thus the two swing cams 9 swing like a single unit.

Although not shown in the drawing, drive shaft 2 and control shaft 12 are rotatably supported by same cam brackets. The above-mentioned eccentric cam 3 is pivotally connected to rocker arm 6 through a link arm 4, and rocker arm 6 is pivotally connected to one of swing cams 9 through a link member 8.

As will become apparent hereinafter, drive shaft 2 is driven by a crankshaft of the engine through a timing chain or timing belt.

Eccentric cam 3 comprises a circular base portion that is connected to drive shaft 2 at an eccentric portion thereof. An annular portion of link arm 4 is rotatably disposed about the circular base portion of electric cam 3.

Rocker arm 6 has a generally center portion rotatably disposed about eccentric cam 18. One end of rocker arm 6 is pivotally connected to an arm portion of the above-mentioned link arm 4 through a connecting pin 5. The other end of rocker arm 6 is pivotally connected to an upper end of the above-mentioned link member 8 through a connecting pin 7. As shown, eccentric cam 18 is eccentric with respect to an axis of control shaft 12. Accordingly, in accordance with rotation of control shaft 12, a rotation center of rocker arm 6 changes.

Each of swing cams 9 is rotatably disposed on drive shaft 2. One of swing cams 9 is pivotally connected at its lateral end to a lower end of link member 8 through a connecting pin 17. Each of swing cams 9 comprises a semi-cylindrical base surface that is concentric with drive shaft 2 and a cam surface that extends from the semi-cylindrical base surface forming a given curved surface thereon. In response to swing movement of the swing cams 9, the semi-cylindrical base surface and the cam surface of each swing cam 9 repeatedly push an upper surface of the corresponding tappet 10 to actuate intake valve 11.

That is, contacting the semi-cylindrical base surface with tappet 10 induces a base condition wherein the lift degree of the intake valve 11 is 0 (zero), while, contacting the cam surface with tappet 10 induces a lift condition wherein lifting of the intake valve 11 takes place. It is to be noted that between the semi-cylindrical base surface and the cam surface, there is provided a ramp surface that induces a smoothed switching between the base and lift conditions of intake valve 11.

As is seen from FIG. 1, control shaft 12 is arranged to rotate about its axis within a given angle by a lift degree/ working angle control actuator 13. That is, actuator 13 is a servomotor. A 1o worm gear 15a driven by the servomotor is meshed with a helical gear 15b that is tightly mounted on control shaft 12. As shown, actuator 13 is controlled by a control unit 19 to which information signals representative of crankangle, engine speed, engine load, temperature of engine cooling water and the like. The rotation angle of control shaft 12 is detected by a rotation angle sensor 14 which is of an analogue type. Based on an information signal issued by the position sensor 14, control unit 19 controls actuator 13 in a given closed loop system.

In the following, operation of lift degree/working angle varying mechanism 1 will be described with the aid of FIG. 1.

When, due to work of an associated engine, drive shaft 2 is rotated, link arm 4 is forced to move upward and downward due to work of eccentric cam 3, and thus, rocker arm 6 is forced to swing. The swinging movement of rocker arm 6 is transmitted to swing cam 9 through link member 8 thereby to swing the swing cam 9 and thus two swing cams 9. (It is to be noted that the two swing cams 9 are integrally connected through the cylindrical connector 9a.) Due to swing movement of the two swing cams 9, the corresponding tappets 10 are actuated and thus the corresponding intake valves 11 are actuated to effect their open and close operation.

When, now, due to work of lift degree/working angle control actuator 13, the rotation angle of control shaft 12 is changed, the swing or rotation center of rocker arm 6 changes. Due to this change, an initial position of rocker arm 6 is changed and thus, an initial swing position of swing cam 9 is changed.

When, for example, a cam portion of eccentric cam 18 assumes an upper position in the drawing, rocker arm 6 assumes an upper position causing the end portion of swing cam 9 where connecting pin 17 is provided to assume an upper position. That is, the initial position of swing cam 9 is so made that the cam surface thereof is separated away from the tappet 10. Accordingly, when, in response to rotation of drive shaft 2, swing cam 9 is forced to swing, the semi-cylindrical base surface of swing cam 9 is forced to contact tappet 10 for a longer time causing a shorter time contact of the cam surface with tappet 10. Accordingly, in such condition, the lift degree of the intake valve 11 becomes small and at the same time the working angle, that is, an angular range of a crankshaft established from a time when intake value 11 just opens to a time when intake valve 11 just closes, becomes small.

While, the cam portion of eccentric cam 18 assumes a lower position, rocker arm 6 assumes a lower position causing the pin-holding end portion of swing cam 9 to assume a lower position. That is, the initial position of swing cam 9 is so made that the cam surface thereof is positioned close to the tappet 10. Accordingly, when, in response to rotation of drive shaft 2, swing cam 9 is forced to swing, the semi-cylindrical base surface of swing cam 9 is forced to contact tappet 10 for a shorter time causing a longer time contact of the cam surface with tappet 10. Accordingly, in such condition, the lift degree of the intake valve 11 becomes large and at the same time the working angle become large.

Figure 2:
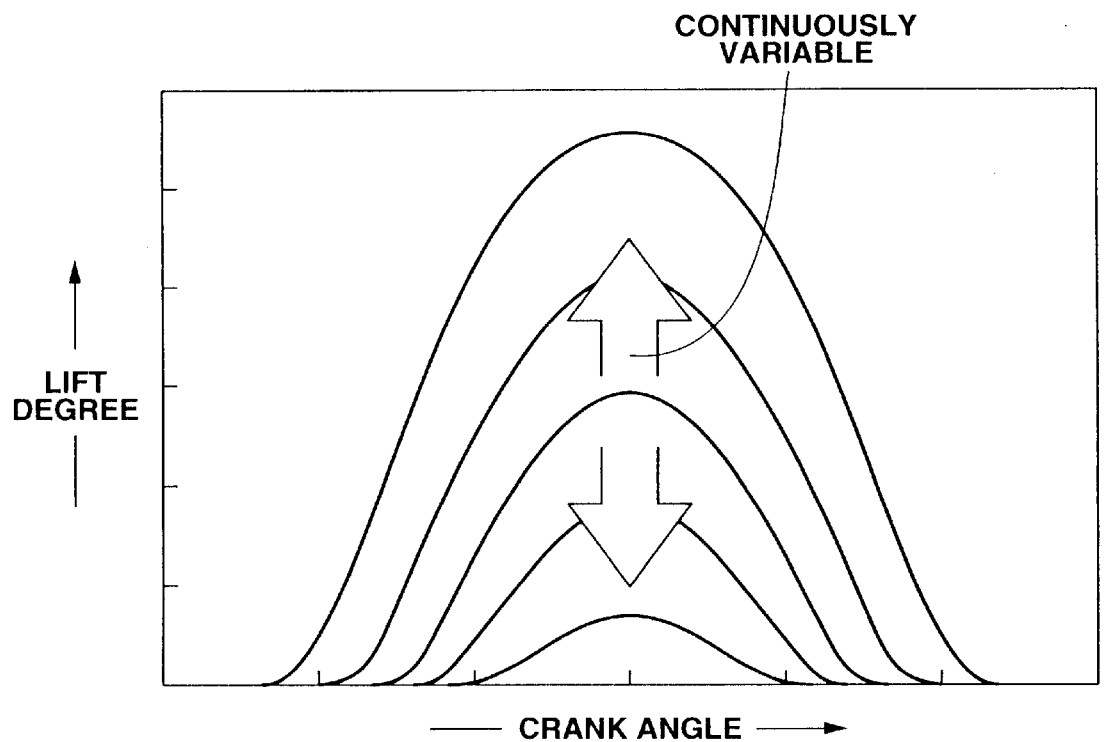
FIG. 2 is a graph showing a valve lift characteristic (viz., variation in lift degree/working angle) possessed by the variable valve control device.
Figure 3:
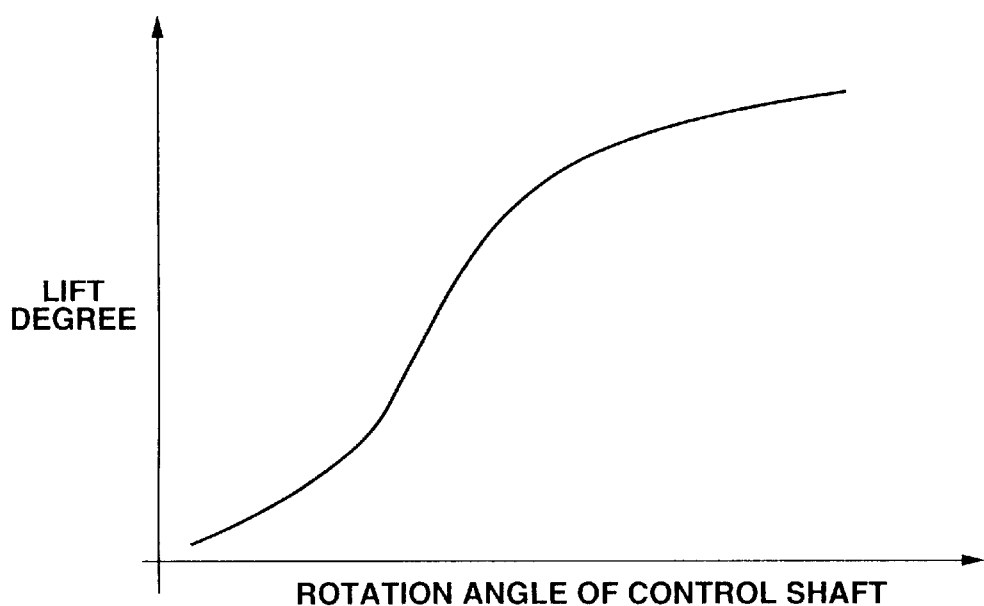
FIG. 3 is a graph showing a relationship between a rotation angle of a control shaft and a variation in the lift degree/working angle.

Because the initial position of eccentric cam 18 is continuously changed by lift degree/working angle control actuator 13, the above-mentioned valve lift characteristic is continuously changed as is understood from the graph of FIG. 2. As is seen from this graph, the lift degree and working angle of the intake valve 11 are both controlled at the same time. As is understood from this graph, by suitably shaping the cam surface of the swing cam 9, the tracks of the valve lift are the am surface symmetric relation with respect to the most lift ed position of the tracks. FIG. 3 shows a relationship between the rotation angle of control shaft 12 and the degree of lift degree/working angle of intake valve 11.

In the following, description will be directed to phase varying mechanism 21 with reference to FIG. 1.

As shown, the mechanism 21 generally comprises a sprocket 22 that is mounted on a front end of drive shaft 2, and a phase control actuator 23 that varies a relative angular position between sprocket 22 and drive shaft 2. As has been described hereinabove, a timing chain or timing belt is put on sprocket 22 to transmit the power of crankshaft of the engine to sprocket 22 and thus to drive shaft 2.

Phase control actuator 23 may be of a hydraulic type, electromagnetic type or the like, so long as it can b e controlled by instruction signal from control unit 19. That is, upon receiving the instruction signal, the actuator 23 effects a relative rotation between sprocket 22 and drive shaft 2 thereby to advance and/or retard the operation phase of intake valve by. That is, without changing the lift characteristic caused by the above-mentioned lift degree/working angle varying mechanism 1, the operation phase of intake valve 11 is independently and continuously changed. Designated by numeral 16 is a drive shaft sensor that detects an angular position of drive shaft 2 and feeds an information signal on the angular position to control unit 19 to control the phase control actuator 23 in a given closed loop.

With the variable valve control device VVCD having the above-mentioned construction, the associated internal combustion engine is able to control the intake air without usage of a conventional throttle valve. That is, by variably controlling the operation timing of the intake valves 11 by the device, the amount of air fed to the engine is controlled. However, in practical use of the engine, a throat structure is provided at an upstream part of the intake passage for producing a certain negative pressure in the intake passage, that is needed for carrying out an exhaust gas recirculation (EGR).

In the following, operation of the engine controlled by the above-mentioned variable valve control device VVCD will be described with the aid of the drawings.

FIG. 4 is a table showing the valve lift characteristic of intake valve 11 that are seen when the engine are in typical operation conditions. As is understood from this graph, when the engine is in a very low load range, such as in an idling condition, the lift degree is quite small. In such a quite small lift degree, the phase of the center position of the lift degree/working angle of intake valve has substantially no effect on the amount of intake air. And, due to work of the phase varying mechanism 21, the operation phase of intake valve 11 is most retarded. Thus, under this condition, the valve closing is effected at a time just before the bottom dead center (BDC).

Under this condition, each intake valve 11 provides only a very small clearance feeding a very small amount of air into the combustion engine, that is needed under such very low load range of the engine. Because the valve closing is effected at a timing very near the bottom dead center (BDC), the effective compression ratio in the combustion chamber is increased to a sufficient level, and thus, with the aid of the very small air introduction, a desirable combustion of air/fuel mixture is achieved.

While, when the engine is in a low load range that is higher in load than the above-mentioned very low load range and includes an idling condition with a certain auxiliary device kept ON, the lift degree (more specifically, the lift degree/working angle) of intake valve 11 increases, and the operation phase of the same is somewhat advanced. Under this condition, the control of intake air is carried out considering the valve operation timing. By advancing the close timing of intake valve 11, the amount of air fed to the combustion chamber is controlled relatively small. As a result, the lift degree/working angle of intake valve 11 is somewhat increased and thus undesired pumping loss caused by intake valve 11 is reduced.

As has mentioned hereinabove, when the engine is in a very low load range wherein intake valve 11 assumes a very small lift degree, changing of the operation phase has substantially no effect on the control of amount of intake air. Accordingly, in case of shifting the engine from the very low load range to the low load range, enlargement of the lift degree/working angle takes precedence over the phase control. Similar operation is made when a load of an auxiliary device such as air compressor of an air conditioner is applied to the engine.

When, due to increase of the load, the engine comes to a middle load range wherein the air/fuel mixture shows a relatively stable combustion, the lift degree/working angle of intake valve 11 is further increased and the operation phase of the same is further advanced as is understood from the table of FIG. 4. As is shown, under this condition, the operation phase is most advanced. Thus, under this condition, internal exhaust gas recirculation "IEGR" is effectively carried out, that promotes reduction of pumping loss of the associated cylinder.

When then the engine comes to a highest load range, the lift degree/working angle of intake valve 11 is further increased, and an appropriate valve operation timing of the same is set by the phase varying mechanism 21. As is seen from a lower part of the table, the valve lift characteristic in the highest load range varies depending on the engine speed.

Figure 5:
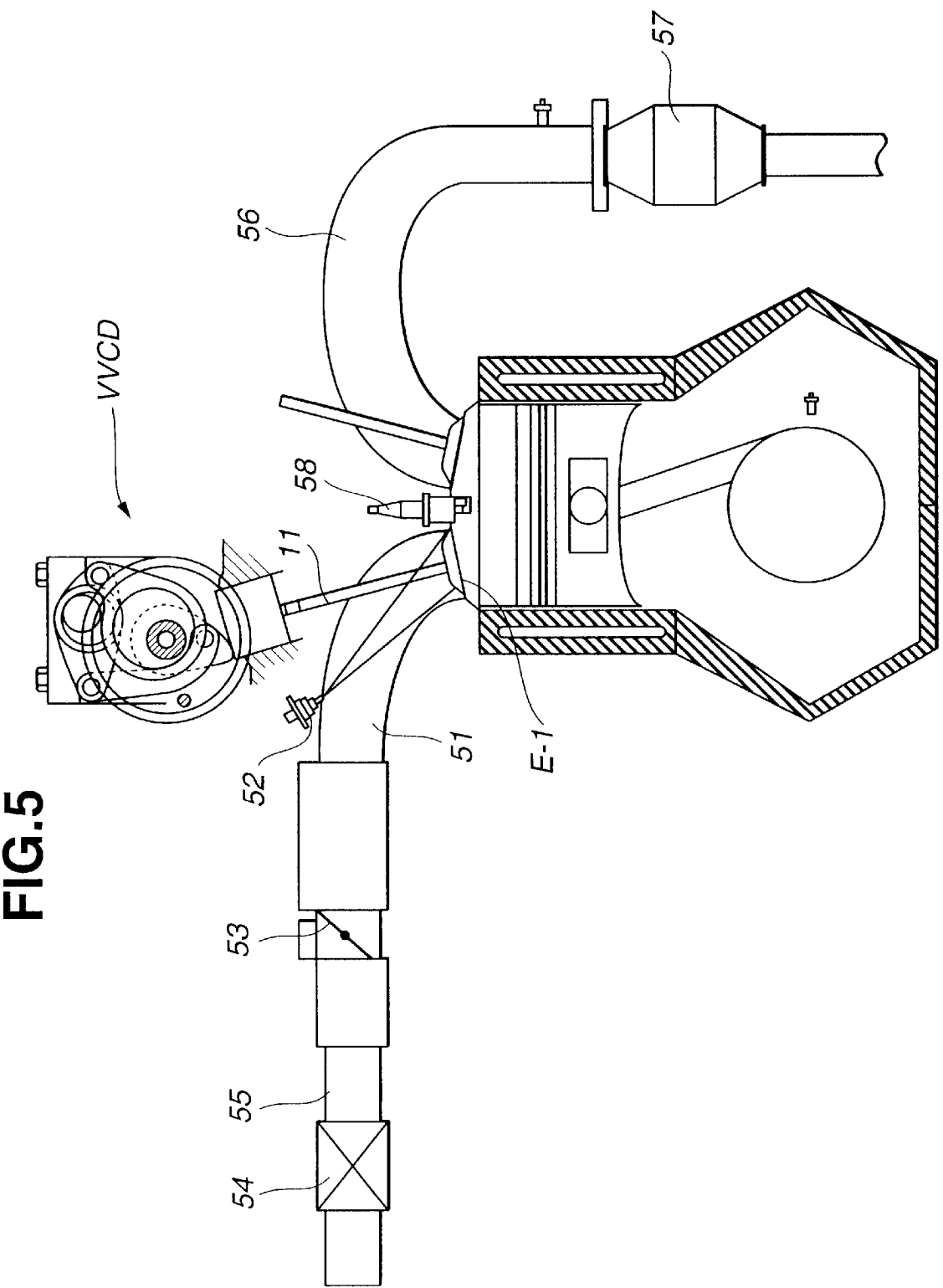
FIG. 5 is a schematic illustration of an internal combustion engine having a fuel feeding system associated therewith.
Figure 6:
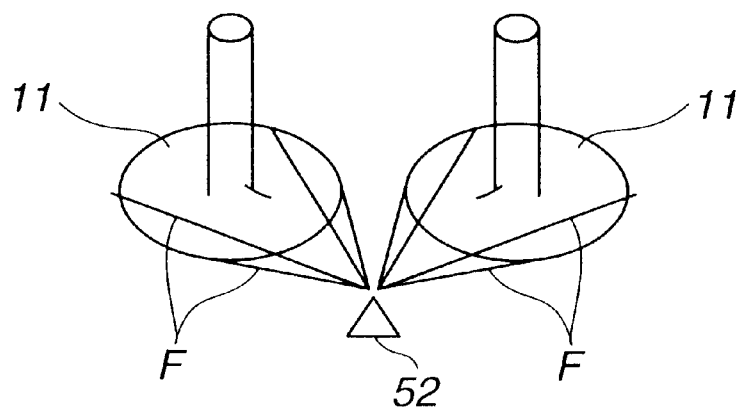
FIG. 6 is an illustration showing the shape of air-fuel mixture injected by a fuel injection valve.

Referring to FIGS. 5 and 6, particularly FIG. 5, there is shown a fuel feeding system employed in the internal combustion engine of the present invention.

In FIG. 5, denoted by numeral 51 is an intake manifold which has a plurality of branches respectively connected to intake ports E-1 of the engine. It is to be noted that each two of the branches are united at their upstream portions to constitute a single pipe zone. The two intake ports E-1 of the engine are controlled by respective intake valves 11 in such a manner as is described hereinabove. An electromagnetically fuel injection valve 52 is installed at the single pipe zone of intake manifold 51.

As is seen from FIG. 6, the fuel injection valve 52 is arranged and constructed to feed the two neighboring intake ports of one cylinder with a measured amount of fuel. More specifically, under operation of the engine, the fuel injection valve 52 injects two conical-shaped sprays of fuel each reaching the corresponding head of intake valve 11. More specifically, the fuel injection is so made that a diametrically enlarged leading end of the conical-shaped fuel spray covers an annular seal area defined by the head of intake valve 11.

Referring back to FIG. 5, denoted by numeral 53 is a negative pressure adjusting valve installed in an air intake passage 55 that has a downstream end connected to an inlet opening of intake manifold 51. Air intake passage 55 has an air cleaner 54 mounted to an upstream part of the passage 55. Denoted by numeral 56 is an exhaust passage that is connected to exhaust ports of the engine in-a known manner. Exhaust passage 56 has a catalytic converter 57 mounted thereon. Denoted by numeral 58 is an ignition plug projected into the combustion chamber of the cylinder.

In the following, a fuel injection manner of fuel injection valve 52 will be described.

When the lift degree of intake valve 11 is reduced by the operation of lift degree/working angle varying mechanism 1, the flow speed of intake air around a periphery of the head of intake valve 11 is increased. If fuel injection is effected when the air speed is high, atomization of fuel is effectively carried out.

Accordingly, when the engine is in a very low load range wherein each intake valve 11 assumes a very small lift degree, a first fuel injection mode "FIAIVO" is easily made without depending on a so-called secondary fuel atomization effected by a second fuel injection mode "FIBIVO".

It is to be noted that the first fuel injection mode "FIAIVO" means a fuel injection mode wherein a fuel injection shot is entirely carried out while the intake valve 11 is kept opened, while the second fuel injection mode "FIBIVO" means a fuel injection mode wherein a fuel injection shot finishes prior to opening of intake valve 11.

Accordingly, the fuel injection timing can switch between first fuel injection mode "FIAIVO" and second fuel injection mode "FIBIVO" in accordance with the lift degree of intake valve 11.

However, if second fuel injection mode "FIBIVO" is made when the lift degree is very small, it tends to occur that fuel drops collects on and around a valve seat of intake valve 11, which would bring about a fuel feeding to the combustion chamber prior to a sufficient development of air speed around the head of intake valve 11, resulting in that fuel particles at an initial stage of fuel feeding have each a larger size. Furthermore, due to variation of the amount of fuel collected on the head of each intake valve 11 in each cycle, the air flow area around the valve head would be forced to vary causing unstable air amount led to the combustion chamber.

Figure 7:
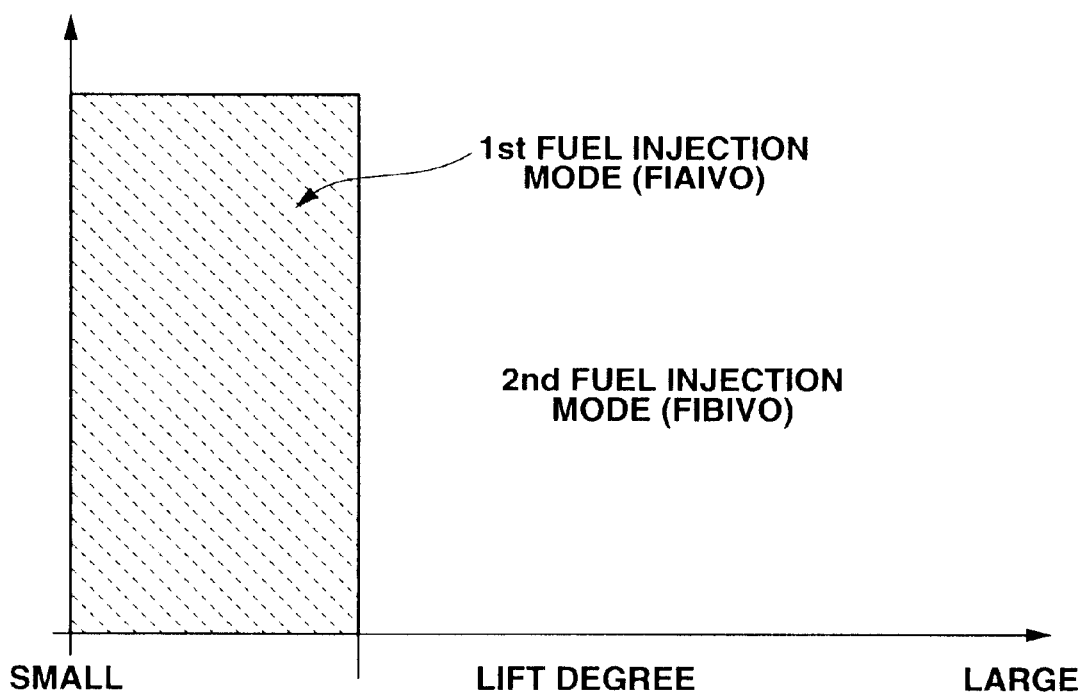
FIG. 7 is a graph showing a switching relation between a first fuel injection mode (viz., FIAIVO) and a second fuel injection mode (viz., FIBIVO) with respect to a lift degree of the intake valve in case of a first embodiment of the present invention.

Accordingly, in a first embodiment of the present invention, as is seen from FIG. 7, the first fuel injection mode "FIAIVO" and the second fuel injection mode "FIBIVO" are controlled in accordance with the lift degree of intake valve 11. That is, when the lift degree is smaller than a predetermined value, the first fuel injection mode "FIAIVO" is carried out, and when the lift degree exceeds the predetermined value, the second fuel injection mode "FIBIVO" is carried out. It is to be noted that the lift degree of intake valve 11 is detected based on a rotation angle of control shaft 12 (see FIG. 1) detected by rotation angle sensor 14.

Figure 8:
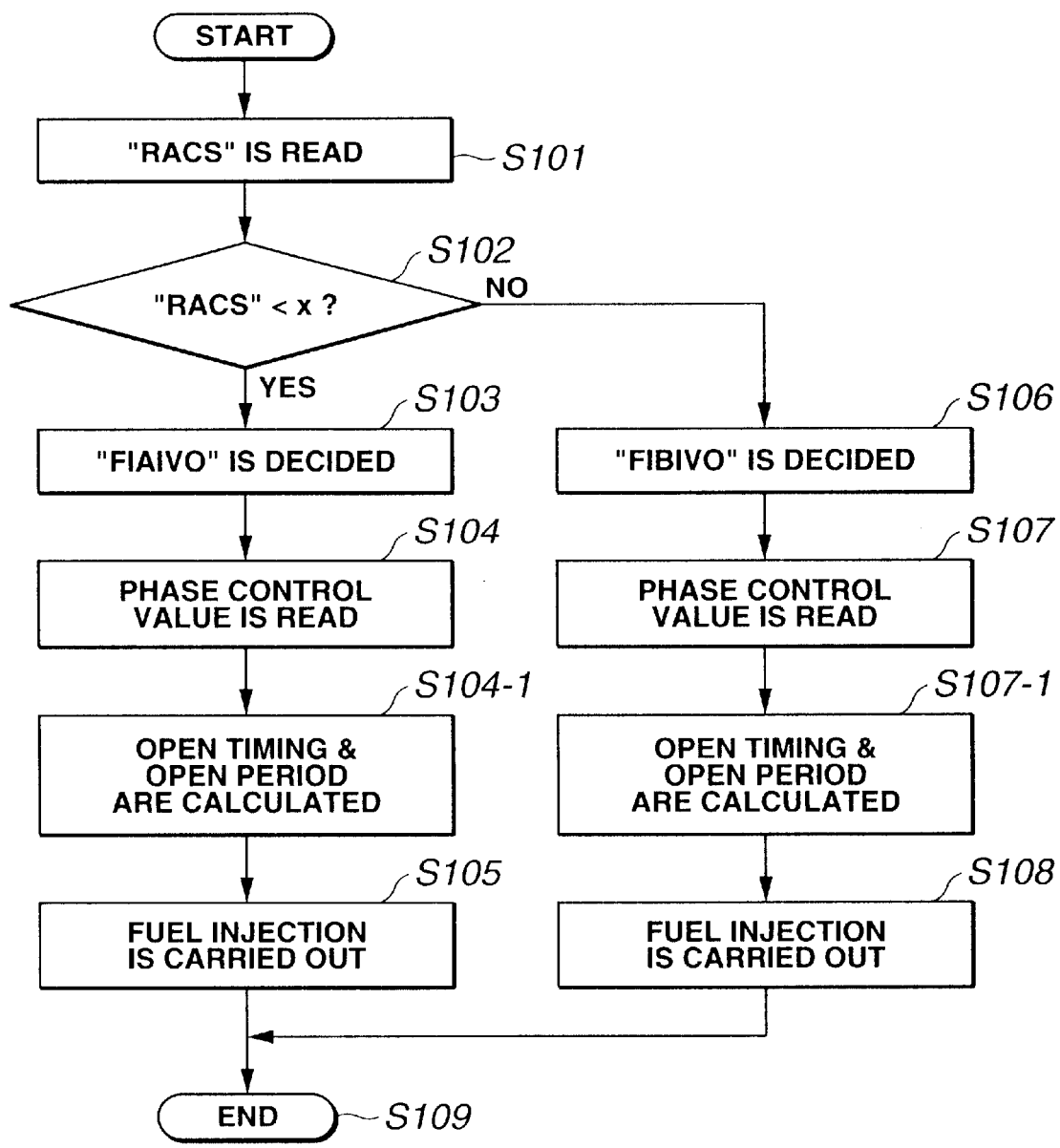
FIG. 8 is a flowchart showing programmed operation steps that are carried out by a control unit employed in the first embodiment.

In the following, control of the fuel injection timing carried out in the first embodiment will be described with reference to the flowchart of FIG. 8.

At step S101, a rotation angle "RACS" of control shaft 12 is read. At step S102, judgment is carried out as to whether the rotation angle "RACS" is smaller than a predetermined value "X" or not. If YES, that is, when the rotation angle "RACS" is smaller than the predetermined value "X", the operation flow goes to step S103 to decide to carry out the first fuel injection mode "FIAIVO". Then, at step S104, a phase control value (viz., advanced degree) effected by phase varying mechanism 21 is read, and at step S104-1, based on both the rotation angle "RACS" of control shaft 12 read at step S101 and the phase control value read at step S104, an open timing and an open period of intake valve 11 are calculated. Then, at step S105, fuel injection is carried out with reference to the opening timing and opening period of intake valve 11 that are calculated at step 5104-1. Thus, fuel is timingly injected into the intake port for a period corresponding to the amount of intake air.

While, if NO at step S102, that is, when the rotation angle "RACS" of control shaft 12 is greater than or equal to the predetermined value "X", the operation flow goes to step S106 to decide to carry out the second fuel injection mode "FIBIVO". As has been mentioned hereinabove, the second fuel injection mode "FIBIVO" is a fuel injection mode wherein actual fuel injection finishes before intake valve 11 is opened. Then, at step S107, a phase control value effected by phase varying mechanism 21 is read, and at step S107-1, based on both the rotation angle "RACS" of control shaft 12 read at step S101 and the phase control value read at step S107, an open timing and an open period of intake valve 11 are calculated. Then, at step S108, fuel injection is carried out with reference to the opening timing and opening period of intake valve 11 that are calculated at step S107-1. That is, at step S108, control is so made that a fuel injection finishes prior to the open timing of intake valve 11 that is calculated at step S107-1 and a subsequent fuel injection starts at a timing prior to a closing timing of intake valve 11 by a period corresponding to the amount of intake air.

Figure 9:
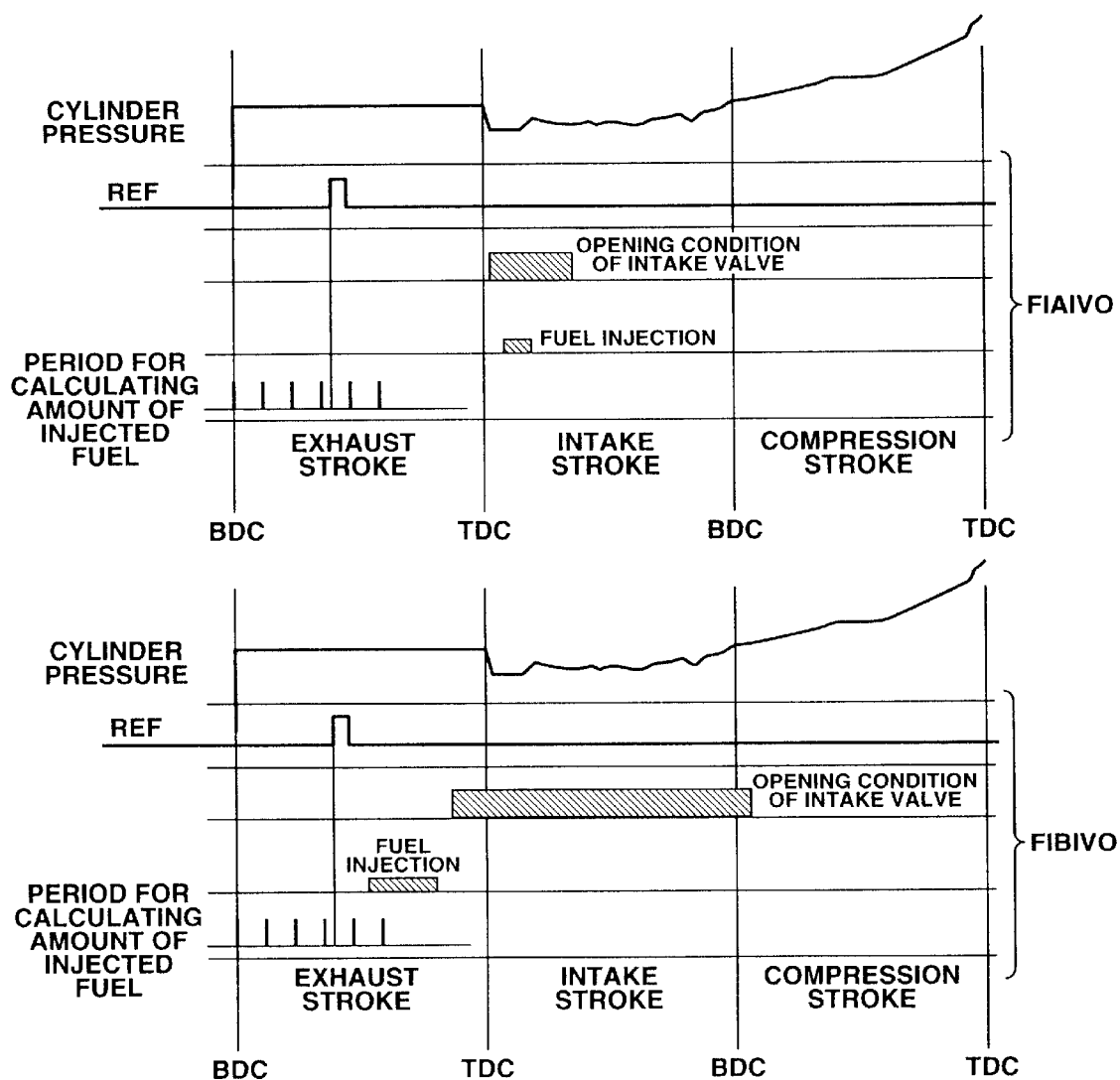
FIG. 9 is a time chart depicting both the first fuel injection mode (FIAIVO) and the second fuel injection mode (FIBIVO) with respect operation strokes of the engine.

FIG. 9 is a time chart that depicts both the first fuel injection mode "FIAIVO" and the second fuel injection mode "FIBIVO" with respect to operation strokes of the engine. In the time chart, reference "BDC" denotes the bottom dead center, "TDC" denotes the top dead center, and "REF" denotes a reference signal.

As is described hereinabove, by carrying out the first fuel injection mode "FIAIVO" with the lift degree of intake valve 11 being small, atomization of fuel around the annual seal area of the head of intake valve 11 where the intake air shows a high speed is effectively carried out. Accordingly, effective fuel combustion and stable air/fuel ratio control are achieved, which brings about an improved drivability of the engine. In fact, due to the effective atomization of the fuel, undesired fuel drop collection on inner surfaces of the intake port is suppressed or at least minimized. Furthermore, by carrying out the second fuel injection mode "FIBIVO" with the lift degree of intake valve 11 being large inducing a low speed air flowing around the annular seal area of the head of intake valve 11, the secondary atomization of fuel is effectively carried out due to work of the heat of intake port and intake valve 11. Accordingly, a homogenized air/fuel mixture is obtained.

Figure 10:
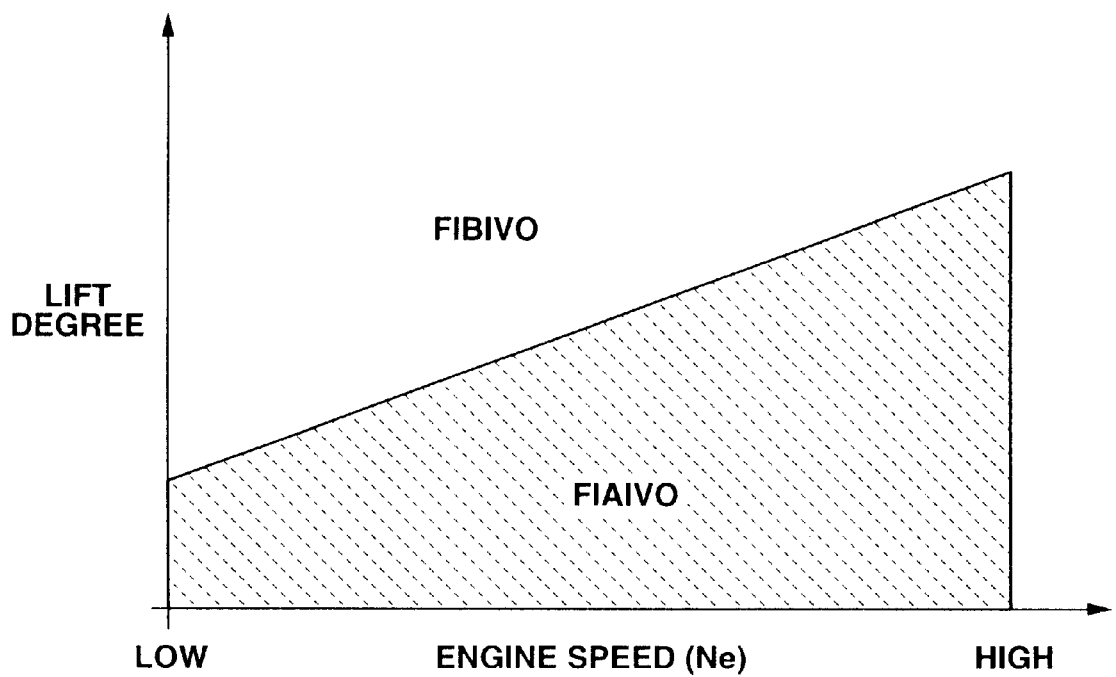
FIG. 10 is a graph showing a switching relation between a first fuel injection mode (FIAIVO) and a second fuel injection mode (FIBIVO) with respect to an engine speed and a lift degree of the intake valve in case of a second embodiment of the present invention.
Figure 11:
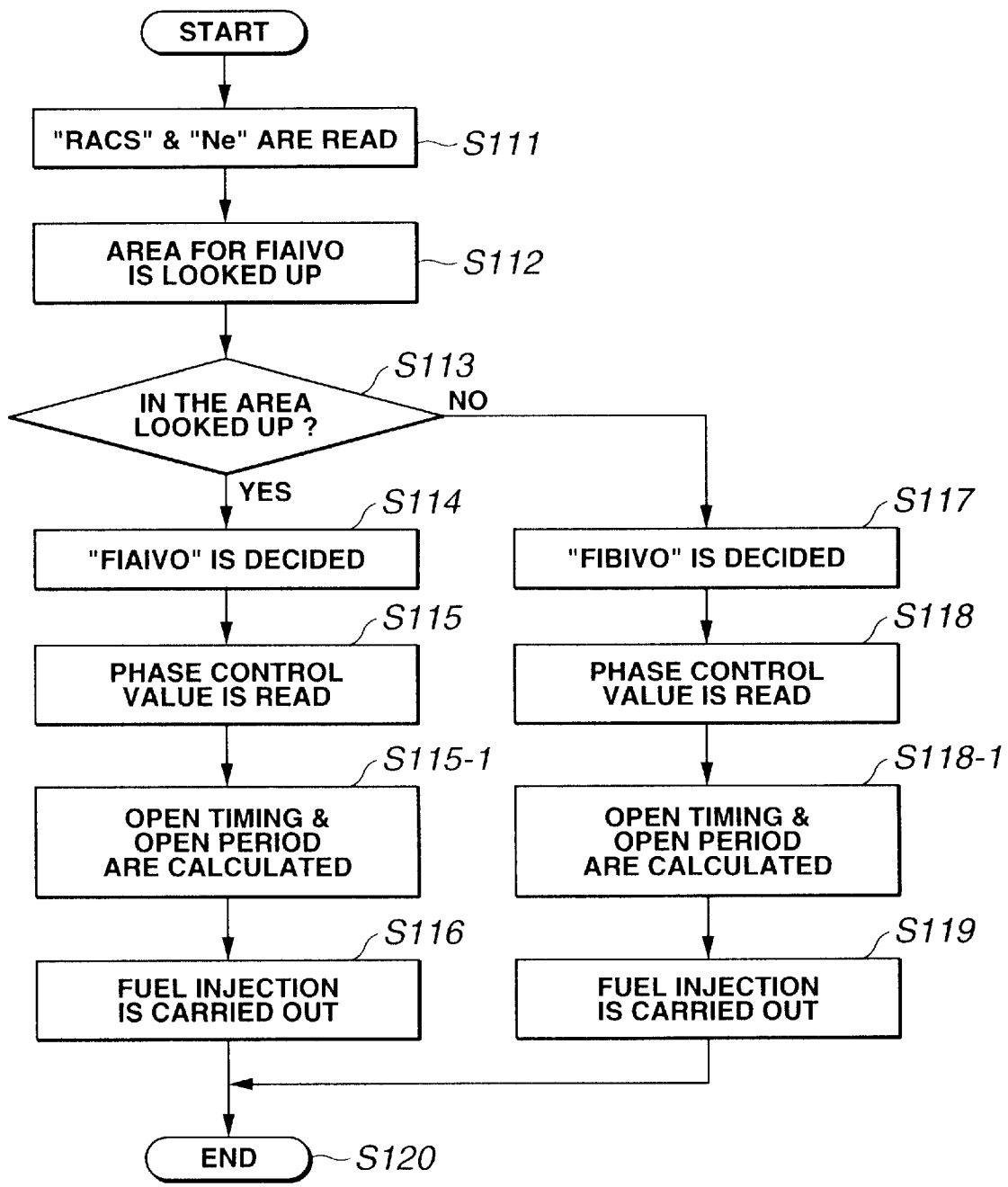
FIG. 11 is a flowchart showing programmed operation steps that are carried out by a control unit employed in the second embodiment.

In FIGS. 10 and 11, there is depicted a second embodiment of the present invention.

In this second embodiment, an engine speed is additionally used as a parameter for controlling the fuel injection timing, more specifically, for controlling the switching timing between the two fuel injection modes "FIAIVO" and "FIBIVO".

As is seen from FIG. 10, in this second embodiment, the lift degree of intake valve 11 and the engine speed are used as parameters for determining the switching timing. That is, basically, below a given lift degree of intake valve 11, the first fuel injection mode "FIAIVO" is carried out, and above the given lift degree, the second fuel injection mode "FIBIVO" is carried out. While, the switching point at which the first fuel injection mode "FIAIVO" changes to the second fuel injection mode "FIBIVO" increases with increase of the engine speed.

This is because of a phenomenon wherein with increase of the engine speed, the intake air speed in intake port is increased, which brings about an increase in lift degree of intake valve 11 that assures the same air flow speed in intake port. When the clearance between the head of the intake valve 11 and the valve seat is so sized as to cause a choke of the intake air, the air flow speed in the clearance is kept unchanged substantially even when the engine speed changes. However, since, upon increase of engine speed, the air flow speed-in a cylinder is increased due to reduction in mixture density in the cylinder, atomization of fuel is promoted.

In the following, control of the fuel injection timing carried out in the second embodiment will be described with reference to the flowchart of FIG. 11.

At step S111, a rotation angle "RACS" of control shaft 12 and engine speed "Ne" are read. At step S112, based on the information "RACS" and "Ne", an area for carrying out the first fuel injection mode "FIAIVO" is looked up from a judging map like the map of FIG. 10. Then, at step S113, judgment is carried out as to whether the engine is in the looked up area or not. If YES, that is, when the engine is under the condition that needs the first fuel injection mode "FIAIVO", the operation flow goes to step S114 to decide to carry out the first fuel injection mode "FIAIVO". Then, at step S115, a phase control value effected by phase varying mechanism 21 is read, and at'step S115-1, based on the is rotation angle "RACS" of control shaft 12 and the engine speed "Ne" that are read at step S111 and the phase control value read at step S115, an open timing and an open period of intake valve 11 are calculated. Then, at step S116, fuel injection is carried out with reference to the open timing and open period of intake valve 11 that are calculated at step S115-1. Thus, fuel is timingly injected into the intake port for a period corresponding to the amount of intake air.

While, if NO at step S113, that is, when the engine is not under the condition that needs the first fuel injection mode "FIAIVO", the operation flow goes to step S117 to decide to carry out the second fuel injection mode "FIBIVO". Then, at step S118, a phase control value effected by phase varying mechanism 21 is read, and at step S118-1, based on the rotation angle "RACS" of control shaft 12 and the engine speed "Ne" that are read at step S111 and the phase control value read at step S115, an open timing and an open period of intake valve 11 are calculated. Then, at step S119, fuel injection is carried out with reference to the opening timing and opening period of intake valve 11 that are calculated at step S118-1. That is, at step S119, control is so made that a fuel injection finishes prior to the opening timing of intake valve 11 that is calculated at step S119-1 and a subsequent fuel injection starts at a timing prior to a closing timing of intake valve 11 by a period corresponding to the amount of intake air.

Accordingly, in the second embodiment, as is understood from FIG. 10, the critical point at which the two fuel injection modes "FIAIVO" and "FIAIVO" switch is increased with increase of the engine speed "Ne".

Figure 12:
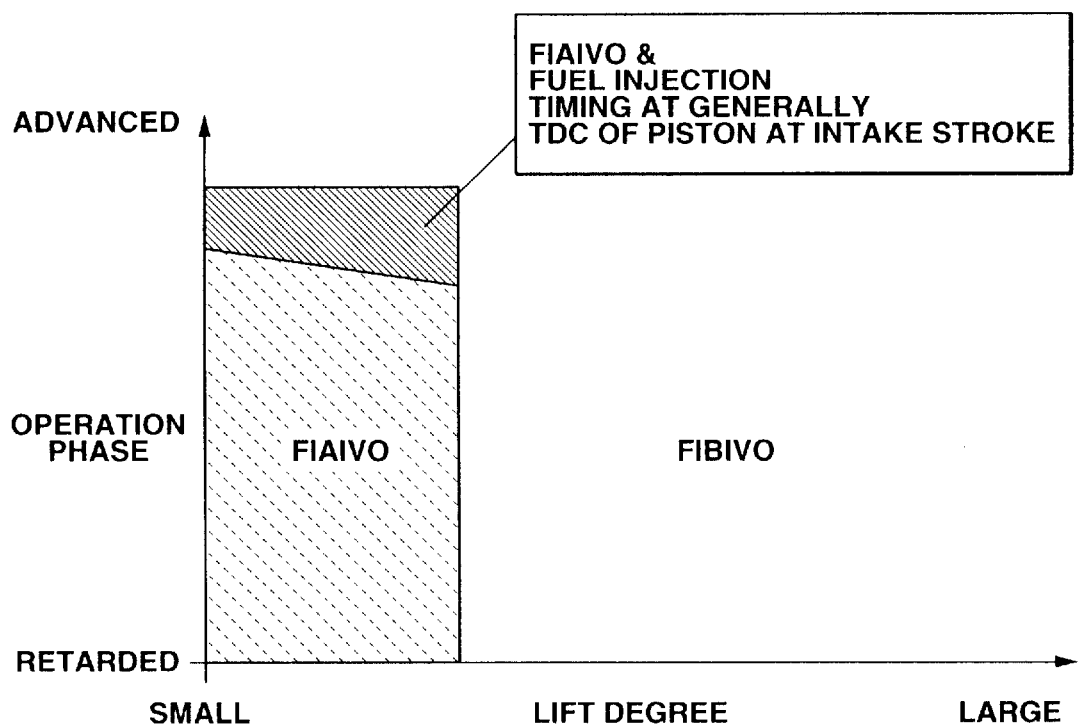
FIG. 12 is a graph showing a switching relation between a first fuel injection mode (FIAIVO) and a second fuel injection mode (FIBIVO) with respect to a lift degree of the intake valve and an advanced angle effected by a phase control, in case of a third embodiment of the present invention.
Figure 13:
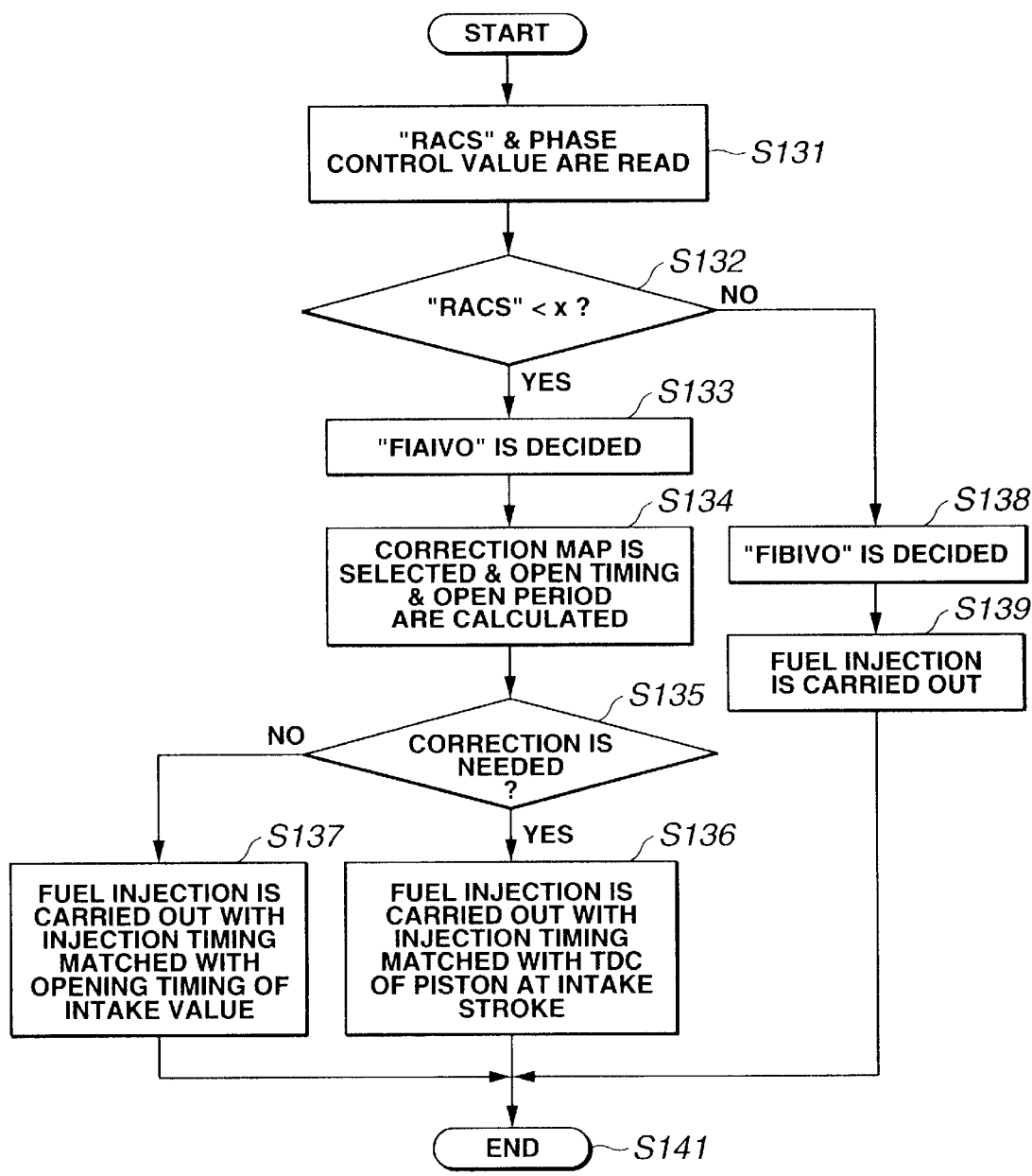
FIG. 13 is a flowchart showing programmed operation steps that are carried out by a control unit employed in the third embodiment of the present invention.

In FIGS. 12 and 13, there is depicted a third embodiment of the present invention.

In this third embodiment, an advanced degree of the operation phase of intake valve is additionally used as a parameter for controlling the fuel injection timing, more specifically, for controlling the switching timing between the two injection modes "FIAIVO" and "FIBIVO".

As is seen from FIG. 12, in this third embodiment, basically, below a given lift degree of intake valve 11, the first fuel injection mode "FIAIVO" is carried out, and above the given lift degree, the second fuel injection mode "FIBIVO" is carried out.

Furthermore, in the mode of the first fuel injection mode "FIAIVO", in accordance with the phase control value and the lift degree of intake valve 11, the fuel injection timing is controlled to select a first timing mode at which the opening movement of intake valve 11 starts or a second timing mode at which the piston takes its upper dead center (UDC) in intake stroke. As is seen from the drawing, in a range where the operation phase of intake valve 11 is largely advanced, the fuel injection timing is set generally at the upper dead center (UDC).

This is because of the following reasons. That is, when intake valve 11 starts opening movement during an exhaust stroke, part of combusted gas in the combustion chamber is forced to flow backward to intake port. Thus, when, under this condition, fuel injection is carried out, it inevitably occurs that the fuel is blown back upstream by the part of combusted gas, which tends to bring about undesirable phenomenon wherein, like in case of the second fuel injection mode "FIBIVO", fuel drops collect on the inner surfaces of intake port or the like.

In order to avoid such undesired phenomenon, in the third embodiment, based on the lift degree of intake valve 11 and the phase control value (viz., advanced degree) of intake valve 11, a valve overlap degree is calculated, so that during the valve overlap period, fuel injection is suppressed.

In the following, control of fuel injection timing carried out in the third embodiment will be described with reference to the flowchart of FIG. 13.

At step S131, a rotation angle "RACS" of control shaft 12 and a phase control value effected by phase varying mechanism 21 are read. At step S132, judgment is carried out as to whether the rotation angle "RACS" is smaller than a predetermined value "X" or not. If YES, that is, when the rotation angle "RACS" is smaller than the predetermined value "X", the operation flow goes to step S133 to decide to carry out the first fuel injection mode "FIAIVO". Then, at step S134, a correction map such as that shown in FIG. 12 is selected and at the same time, based on the rotation angle "RACS" of control shaft 12 and the phase control value that are read at step S131, an opening time and an opening period of intake valve 11 are calculated. At step S135, with respect to the above-mentioned correction map, judgment is carried out as to whether a correction for changing the fuel injection timing to the second timing mode, that is, the mode wherein the fuel injection timing is effected at the upper dead center (UDC) of the piston in intake stroke, is needed or not. If YES, that is, when it is judged that the correction is needed, the operation flow goes to step S136 and the fuel injection timing is corrected to the second timing mode. While, NO at step S135, that is, when it is judged that the correction is not needed, the operation flow goes to step S137 and the fuel injection timing is controlled to the timing at which intake valve 11 starts its opening movement, like in the case of the above-mentioned first embodiment.

If NO at step S132, that is, when the rotation angle "RACS" is greater or equal to the predetermined value "X", the operation flow goes to step S138 to decide to carry out the second fuel injection mode "FIBIVO" and, at the same time, based on the rotation angle "RACS" of control shaft 12 and the phase control value, an opening timing and an opening period are calculated. Then, at step S139, fuel injection is carried out with reference to the opening timing and opening period that are read at step S138. That is, the fuel injection is so made that a fuel injection finishes prior to the open timing of intake valve 11 that is calculated at step S138 and a subsequent fuel injection starts at a timing prior to a closing timing of intake valve 11 by a period corresponding to the amount of intake air.

Figure 14:
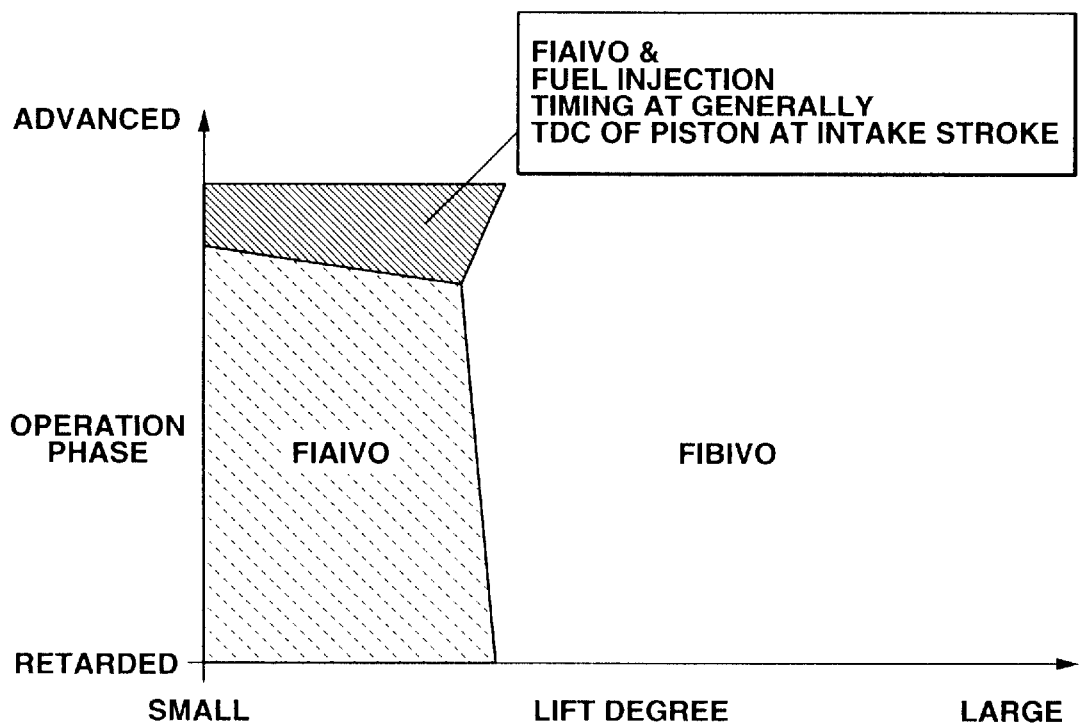
FIG. 14 is a graph showing a switching relation between a first fuel injection mode (FIAIVO) and a second fuel injection mode (FIBIVO) with respect to a lift degree of the intake valve and an advanced angle effected by a phase control, in case of a fourth embodiment of the present invention.
Figure 15:
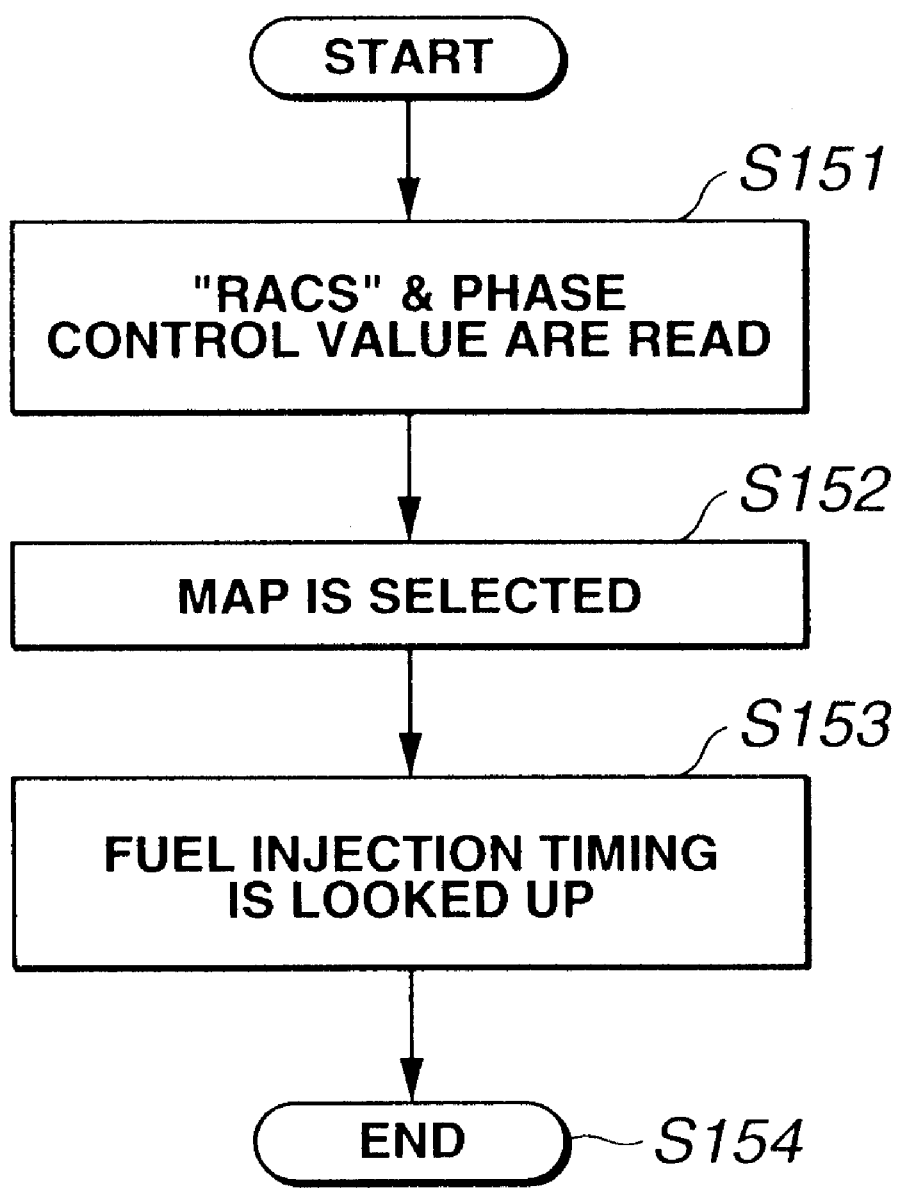
FIG. 15 is a flowchart showing programmed operation steps that are carried out by a control unit employed in the fourth embodiment of the present invention.

Accordingly, in the third embodiment, as is seen from FIG. 12, below the given lift degree of intake valve 11, the first fuel injection mode "FIAIVO" is selected, and in case wherein, due to a valve overlap, a back flow of combusted gas toward intake port tends to occur, starting of fuel injection is so controlled as to match with the upper dead center (UDC) of the piston in intake stroke. Thus, undesired back flow of fuel under intake stroke is avoided. In FIGS. 14 and 15, there is depicted a fourth embodiment of the present invention.

This embodiment is similar to the above-mentioned third embodiment. As is seen from FIG. 14, in this fourth embodiment, a critical lift degree of intake valve 11 at a time when the first fuel injection mode "FIAIVO" is effected is varied in accordance with the phase control value effected by phase varying mechanism 21.

That is, when the valve overlap is set in a minus characteristic, the interior of the cylinder is subjected to an adiabatic expansion in the intake stroke, and thus the pressure in cylinder is lowered. As is described hereinabove, when intake valve 11 shows a small lift degree, the working angle is small.

Thus, when the valve phase control effected by phase varying mechanism 21 is shifted to a retarded side, minus valve overlap is established and thus the adiabatic expansion is caused. In this case, a differential pressure between the intake port and the cylinder increases and thus the intake air speed at the time when intake valve 11 starts its opening movement is increased. Accordingly, as is seen from FIG. 14, the lift degree for the first fuel injection mode "FIAIVO" can be increased at a retarded side.

In a range where the operation phase of intake valve 11 is advanced by phase varying mechanism 21, the valve overlap shows a plus characteristic. When, under this condition, the phase of intake valve 11 is further advanced, the amount of combusted gas for internal EGR increases and thus heat applied to intake air increases. Accordingly, as is seen from FIG. 14, atomization of fuel at the advanced side is much promoted, and thus, the lift degree for the first fuel injection mode "FIAIVO" can be increased.

In the following, control of the fuel injection timing carried out by the fourth embodiment will be described with reference to the flowchart of FIG. 15.

At step S151, a rotation angle "RACS" of control shaft 12 and a phase control value effected by phase varying mechanism 30 21 are read. Then, at step S152, based on the rotation angle "RACS" and the phase control value read at step S151, a certain map such as one as shown in FIG. 14 is selected for deciding the fuel injection timing. Then, at step S153, the fuel injection timing is looked up from the map. Like in case of the above-mentioned embodiments, in case of the second fuel injection mode "FIBIVO", the fuel injection start timing is derived from the time when a previous fuel injection finishes. In the fourth embodiment, as is understood from FIG. 12, with increase of advanced degree effected by phase varying mechanism 21, the critical lift degree for the first fuel injection mode "FIAIVO" can be increased.

In the present invention, it is preferable to take into consideration a reactive pulse width that is inevitably produced when a fuel injection valve is energized. Furthermore, in view of a fact that the time taken when the fuel injected from an injection valve reaches an intake valve is quite important, it is much preferable to take the time into consideration for controlling the fuel injection timing.

Although the invention has been described above with reference to the embodiments of the invention, the invention is not limited to such embodiments as described above. Various modifications and variations of such embodiments may be carried out by those skilled in the art, in light of the above description.

What is claimed is:

1. An internal combustion engine comprising:
    a variable valve control device that varies a lift degree of an intake valve;
    an air intake passage led to an intake port of the engine that is incorporated with the intake valve;
    a fuel injection valve arranged to inject fuel into the intake port, the fuel injection valve having a first injection mode wherein each fuel injection shot is carried out during opening period of the intake valve and a second injection mode wherein each fuel injection shot finishes prior to opening action of the intake valve; and
    a control unit that allows the fuel injection valve to select one of the first and second injection modes in accordance with the lift degree of intake valve effected by the variable valve control device.

2. An internal combustion engine as claimed in claim 1, in which the control unit is configured to carry out:
    allowing the fuel injection valve to select the first injection mode when the lift degree of the intake valve is smaller than a predetermined degree; and
    allowing the fuel injection valve to select the second injection mode when the lift degree of the intake valve is greater than or equal to the predetermined degree.

3. An internal combustion engine as claimed in claim 2, in which the variable valve control device is arranged to increase the lift degree of intake valve in accordance with increase in engine speed.

4. An internal combustion engine as claimed in claim 2, in which the variable valve control device comprises a phase varying mechanism that varies an operation phase of the intake valve relative to a crankshaft of the engine, and in which the control unit is configured to carry out:

allowing the fuel injection valve to start its fuel injection after the time of a top dead center (TDC) of a piston in intake stroke when, under the first injection mode, the operation phase of the intake valve assumes a range that is advanced from a predetermined phase.

5. An internal combustion engine as claimed in claim 4, in which the variable valve control device is arranged to increase the lift degree of the intake valve with advancement of the operation phase effected by the phase varying mechanism.

6. An internal combustion engine as claimed in claim 1, in which the variable valve control device comprises a lift degree/working angle varying mechanism which includes a drive shaft powered by the engine, an eccentric cam connected to the drive shaft to rotate therewith, a link arm rotatably disposed on the eccentric cam, a control shaft extending in parallel with the drive shaft and swingable about its axis within a given angular range, an eccentric cam portion possessed by the control shaft, a rocker arm rotatably disposed about the eccentric cam portion and pivotally connected to the link arm, a swing cam rotatably disposed on the drive shaft and pivotally connected to the rocker arm for actuating the intake valve, and a lift degree/working angle control actuator that controls an angular position of the control shaft.

7. An internal combustion engine as claimed in claim 6, in which the variable valve control device further comprises a phase varying mechanism which includes a sprocket that is mounted on the drive shaft to rotate therewith, and a phase control actuator that varies a relative angular position between the sprocket and the drive shaft.

8. An internal combustion engine as claimed in claim 1, in which the fuel injector is constructed to inject a conical-shaped spray of fuel whose annular front end reaches an annular seal area defined by a head of the intake valve.

9. An internal combustion engine comprising:

a variable valve control device including a lift degree/working angle varying mechanism that varies a lift degree/working angle of an intake valve, and a phase varying mechanism that varies an operation phase of the intake valve;

an air intake passage led to an intake port of the engine that is incorporated with the intake valve;

a fuel injection valve arranged to inject fuel into the intake port, the fuel injection valve being arranged to have a first injection mode wherein each fuel injection shot is entirely carried out during opening period of the intake valve and a second injection mode wherein each fuel injection shot entirely finishes prior to opening action of the intake valve; and a control unit that controls the variable valve control device and the fuel injection valve in accordance with an operation condition of the engine, the control unit allowing the fuel injection valve to select one of the first and second injection modes in accordance with the lift degree/working angle of intake valve effected by the lift degree/working angle varying mechanism.

10. In an internal combustion engine comprising a variable valve control device that varies a lift degree of an intake valve; an air intake passage led to an intake port of the engine that is incorporated with the intake valve; and a fuel injection valve arranged to inject fuel into the intake port, the fuel injection valve having a first injection mode wherein each fuel injection shot is carried out during opening period of the intake valve and a second injection mode wherein each fuel injection shot finishes prior to opening action of the intake valve, a method for controlling the engine, which comprises allowing the fuel injection valve to select one of the first and second injection modes in accordance with the lift degree of intake valve effected by the variable valve control device.

\* \* \* \* \*